US009799239B1

(12) United States Patent
Frost

(10) Patent No.: US 9,799,239 B1
(45) Date of Patent: Oct. 24, 2017

(54) ELLIPTICAL CORRUGATED SIGNAGE

(71) Applicant: VANGUARD PACKAGING, INC., Kansas City, MO (US)

(72) Inventor: Jerry Ryan Frost, Kansas City, MO (US)

(73) Assignee: Vanguard Packaging, Inc., Kansas City, MO (US)

( * ) Notice: Subject to any disclaimer, the term of this patent is extended or adjusted under 35 U.S.C. 154(b) by 20 days.

(21) Appl. No.: 14/840,417

(22) Filed: Aug. 31, 2015

Related U.S. Application Data

(63) Continuation of application No. 14/216,721, filed on Mar. 17, 2014, now Pat. No. 9,123,262.

(60) Provisional application No. 61/791,437, filed on Mar. 15, 2013.

(51) Int. Cl.
*G06F 15/00* (2006.01)
*G09F 7/00* (2006.01)
*B31D 5/04* (2017.01)
*G09F 15/00* (2006.01)

(52) U.S. Cl.
CPC ................ *G09F 7/00* (2013.01); *B31D 5/04* (2013.01); *G09F 15/0062* (2013.01)

(58) Field of Classification Search
CPC .............................. G09F 15/0062; G09F 7/00
USPC .......................................................... 40/610
See application file for complete search history.

(56) References Cited

U.S. PATENT DOCUMENTS 2,578,060 A 12/1951 Grant
2,918,178 A 12/1959 Leone
3,195,798 A 7/1965 Wilson
3,362,610 A 1/1968 Van Dyke
3,987,737 A 10/1976 Smith
4,341,338 A 7/1982 Arnold
4,383,636 A 5/1983 Chaffers
4,427,108 A 1/1984 Coles et al.
4,458,838 A 7/1984 Lacasa et al.
4,506,790 A 3/1985 Muscari
4,567,996 A 2/1986 Muise
4,646,922 A 3/1987 Smith
4,871,067 A 10/1989 Valenti
5,016,545 A 5/1991 Robertson et al.
5,145,244 A 9/1992 Kersting et al.
5,190,211 A 3/1993 Stoddard et al.

(Continued)

FOREIGN PATENT DOCUMENTS

DE 3824930 A1 1/1990
GB 1188834 A 7/1966

*Primary Examiner* — Kristina N Junge
(74) *Attorney, Agent, or Firm* — Kutak Rock LLP; Bryan P. Stanley

(57) ABSTRACT

A corrugated display sign with a main body having an inner surface and an outer surface, with the body including a first portion and a second portion. The sign further includes at least one or more formers, and in some embodiments two or more formers, secured to the first portion of the inner surface of the main body, with the formers each including a tab section that secures the former to the main body, a front body portion with a wing portion, and a back body portion with a wing portion. Further, the second portion of the main body is folded around the first portion and the formers, so as to create an elongated elliptical shape for the sign. The display sign is capable of being erected from a knockdown configuration to an erected configuration by folding the former body portions and the wing, and folding the second portion of the main body around the first portion and the formers.

18 Claims, 6 Drawing Sheets

(56) References Cited

U.S. PATENT DOCUMENTS

| | | | |
|---|---|---|---|
| 5,193,466 | A | 3/1993 | Eder |
| 5,213,220 | A | 5/1993 | McBride |
| 5,253,769 | A | 10/1993 | Vlastakis |
| 5,277,360 | A | 1/1994 | DeMott |
| 5,301,800 | A | 4/1994 | Kenney |
| 5,316,210 | A | 5/1994 | Scullin |
| 5,333,777 | A | 8/1994 | Roth |
| 5,702,011 | A | 12/1997 | Carroll |
| 5,706,959 | A | 1/1998 | Smith |
| 5,826,732 | A | 10/1998 | Ragsdale |
| 5,966,857 | A | 10/1999 | Pettersson et al. |
| 6,068,140 | A | 5/2000 | Mangrum et al. |
| 6,126,254 | A | 10/2000 | Maglione |
| 6,347,772 | B1 | 2/2002 | L'Hotel |
| 6,378,710 | B1 | 4/2002 | Grueneberg |
| 6,508,023 | B2 | 1/2003 | Moss et al. |
| 6,612,669 | B2 | 9/2003 | Grueneberg |
| 6,715,623 | B2 | 4/2004 | Broerman |
| 7,007,615 | B2 | 3/2006 | Grueneberg |
| 7,066,342 | B2 | 6/2006 | Baechle et al. |
| 7,111,735 | B2 | 9/2006 | Lowry |
| 7,134,230 | B1 | 11/2006 | Boens et al. |
| 7,137,517 | B2 | 11/2006 | Lowry et al. |
| 7,252,200 | B1 | 8/2007 | Hester |
| 7,281,648 | B2 | 10/2007 | Lowry |
| 7,546,927 | B2 | 6/2009 | Lowry et al. |
| 7,634,865 | B2 | 12/2009 | L'Hotel |
| 8,596,518 | B2 | 12/2013 | Babcock |
| 2002/0108541 | A1 | 8/2002 | Grueneberg |
| 2003/0160015 | A1 | 8/2003 | Broerman |
| 2005/0067321 | A1 | 3/2005 | Pitts et al. |
| 2008/0030113 | A1 | 2/2008 | Vail |
| 2008/0083682 | A1 | 4/2008 | Moss et al. |
| 2008/0169340 | A1 | 7/2008 | Sheffer |
| 2009/0119956 | A1 | 5/2009 | Martin Presa |
| 2010/0236117 | A1 | 9/2010 | Mestres Armengol et al. |
| 2012/0012734 | A1 | 1/2012 | Tzuo |
| 2012/0227297 | A1 | 9/2012 | Kawaguchi et al. |
| 2013/0213915 | A1 | 8/2013 | Pfeifer et al. |
| 2013/0219760 | A1 | 8/2013 | Acker et al. |

ELLIPTICAL CORRUGATED SIGNAGE

RELATED APPLICATIONS

The present patent application is a continuation application of co-pending U.S. patent application Ser. No. 14/216,721 filed Mar. 17, 2014, which claims priority benefit, with regard to all common subject matter, of earlier-filed U.S. Provisional Patent Application No. 61/791,437, filed Mar. 15, 2013, and entitled "FACETED CORRUGATED SIGNAGE." The identified earlier-filed patent applications are hereby incorporated by reference in their entirety into the present non-provisional application.

FIELD

Embodiments of the present invention relate generally to the field of point of purchase merchandise displays. More particularly, embodiments of the present invention relate to a corrugated, paperboard sign that is manufactured in a fold and glue assembly process and that is traditionally provided to an end user in a collapsed or knockdown configuration for setup.

BACKGROUND

Corrugated signs and containers are often made from pieces of flat paperboard stock material that are die cut into shapes that define various panels. The shapes are folded along predefined lines between the panels with overlapping sides, strips, or panels that are glued, taped or otherwise affixed to another panel to form an enclosed boundary. The panels are folded and/or glued into place to become the walls of the sign or container. The signs and/or containers are traditionally provided to product manufacturers and/or retailers in a collapsed or knockdown configuration for storage, handling and shipping. The manufacturer and/or retailers open the knockdown signs or containers and fold them appropriately to erect the assembled signs or containers for display.

The corrugated signs or containers are typically manufactured by feeding flat die cut sheets through a fold-and-glue machine. The fold-and-glue machine applies adhesive and folds over select panels so that the panels are in the knockdown configuration. Signs associated with corrugated display containers, as well as corrugated and/or plastic signage in general, are traditionally made from flat pieces of corrugated or plastic material. Such signs are one-dimensional and often relatively unimpressive. Therefore, it would be beneficial to provide a corrugated paperboard signage assembly that is three-dimensional and that transforms quickly and easily from a knockdown to an erected configuration. While, some prior art corrugated signs have been developed that are three dimensional, specifically the Lama™ display by Marins™ (an elliptically shaped sign), such signs generally include numerous internal pieces and rubber bands to activate the display. Furthermore, many of the internal pieces must be installed by hand. Therefore, it would be beneficial to provide a three-dimensional corrugated paperboard signage assembly that is simple in construction and/or that can be manufactured primarily by machine.

SUMMARY

Embodiments of the present invention include a corrugated sign with a main body having an inner surface and an outer surface, with the body including a first portion and a second portion. The sign further includes at least one, and in some embodiments two or more, formers secured to the first portion of the inner surface of the main body, with the formers each including a tab section that secures the former to the main body, a front body portion with a wing portion, and a back body portion with a wing potion. Further, the second portion of the main body is folded around the first portion and the formers, so as to create an elongated elliptical shape for the sign.

Embodiments of the present invention further include a method for making a corrugated sign including: forming a main body with a first section and a second section; forming a fold line on the main body between the first and second sections; joining at least one, and in some embodiments, two or more formers on the first section of the main body; folding the second section about the first section and the two formers; and securing an end of the second section with an end of the first section.

Embodiments of the present invention further include a method for erecting a corrugated sign. Steps of the method include an initial step of providing the corrugated display sign in a knockdown configuration, with the corrugated display sign including a main body with a first portion and a second portion and a former panel secured to the main body. The former panel includes a tab section that secures the former to the main body, a front body portion with a wing portion, and a back body portion with a wing portion. The method includes an additional step of folding front body portion and the back body portion until the portions are generally orthogonal with the main body. A next step includes folding the wing portions of the front body portion and the back body portion until the wing portions are generally orthogonal with the body portions. A next step includes folding the second portion of the main body around the first portion and the formers. A final step includes securing an end of the second portion with an end of the first portion.

The foregoing and other objects are intended to be illustrative of the invention and are not meant in a limiting sense. Many possible embodiments of the invention may be made and will be readily evident upon a study of the following specification and accompanying drawings comprising a part thereof. Various features and subcombinations of invention may be employed without reference to other features and subcombinations. Other objects and advantages of this invention will become apparent from the following description taken in connection with the accompanying drawings, wherein is set forth by way of illustration and example, an embodiment of this invention and various features thereof.

BRIEF DESCRIPTION OF THE DRAWING FIGURES

Embodiments of the present invention are described in detail below with reference to the attached drawing figures, wherein.

Figure 1:
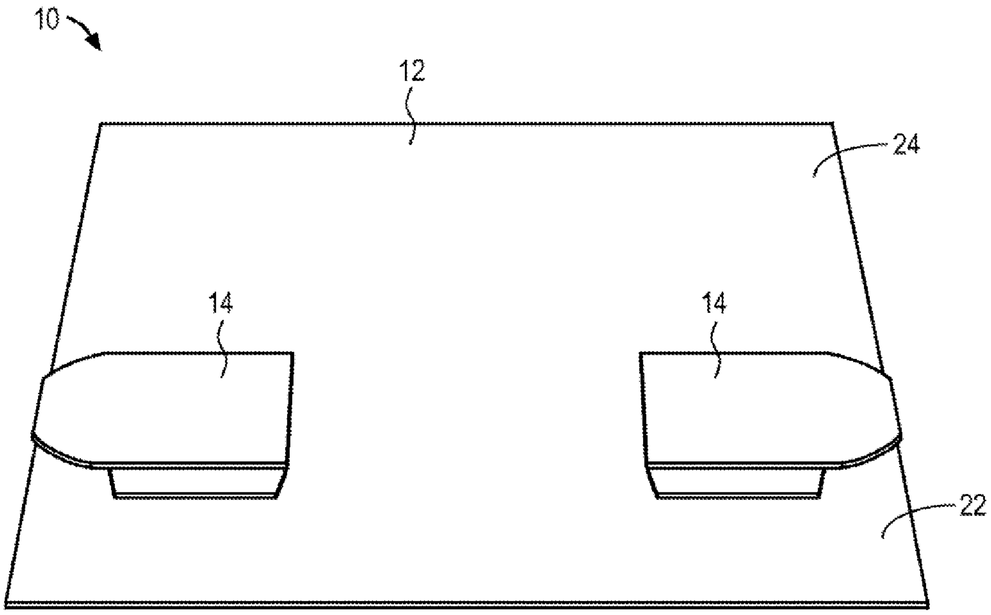
FIG. 1 is perspective view of a signage assembly in a knockdown configuration according to embodiments of the present invention, with the signage assembly including a main body and two formers.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

As used herein, the term "longitudinal" generally refers to an orientation or direction relative to an axis of elongation, whereas "lateral" refers to an orientation or direction that is generally perpendicular to the axis of elongation.

Figure 6:
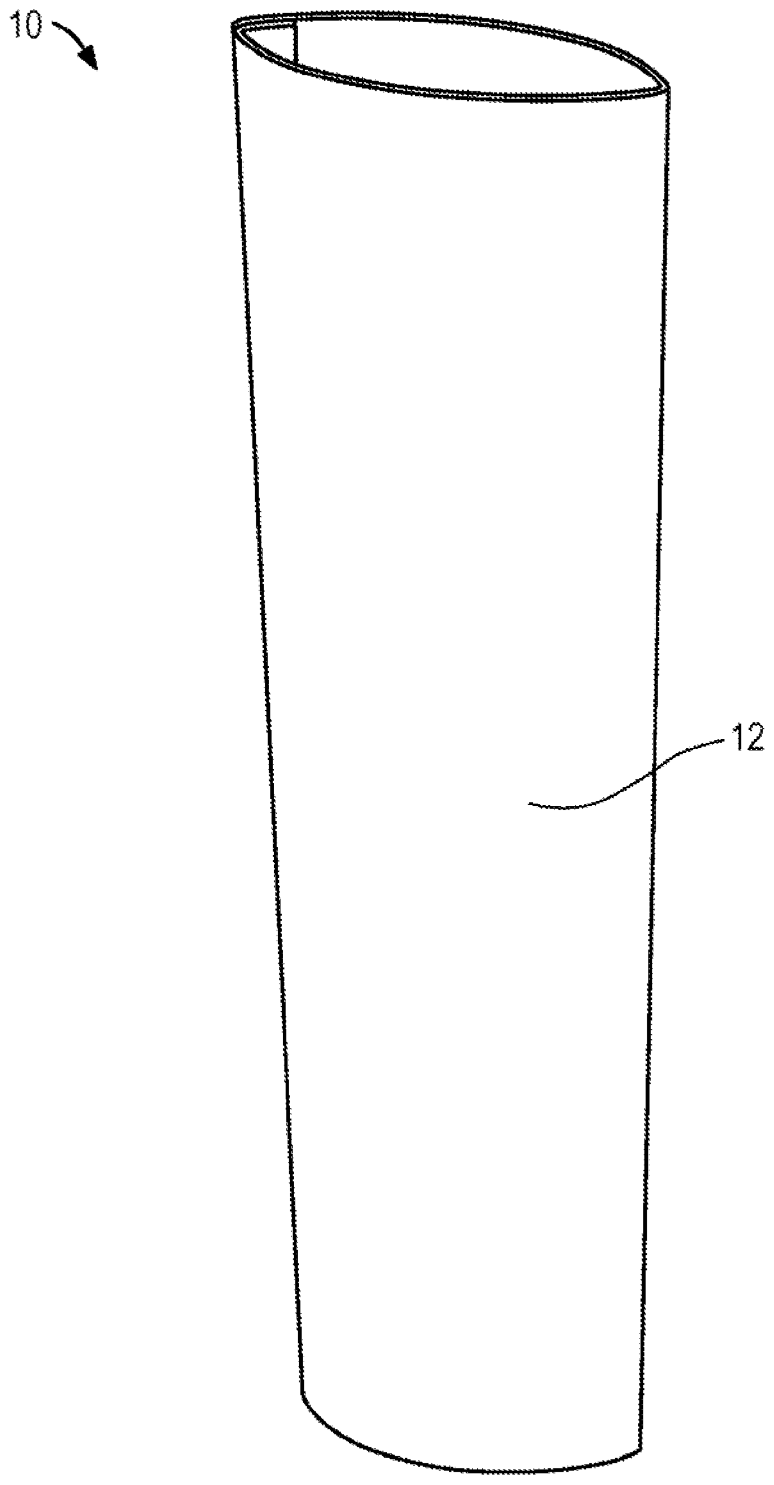
FIG. 6 is perspective view of the signage assembly from FIGS. 1, 2, 4, and 5 in the erected configuration according to embodiments of the present invention, with the signage positioned vertically.

Embodiments of the present invention provide a corrugated paperboard signage assembly 10 that is capable of initially being provided in a two-dimensional knockdown configuration, such as illustrated in FIG. 1. From the knockdown configuration, the signage assembly 10 is capable of being erected into a three-dimensional configuration, such as illustrated in FIG. 6. Remaining with FIG. 1, the signage assembly 10 of embodiments of the present invention comprises a main body 12 and a pair of die cut formers 14 that are attached to the main body. In certain embodiments, each of the main body 12 and the formers 14 are formed from corrugated material. In some embodiments, such corrugated material includes paperboard. Nevertheless, other embodiments provide for the corrugated material to include other similar type materials, such as cardboard, fiberboard, or the like. In certain embodiments, the main body 14 comprises a rectangular-shaped panel of corrugated material. Nevertheless, in other embodiments, portions of the main body 12 are formed in other geometric shapes, such as hyperbolic, elliptical, segmented, or the like.

Figure 2:
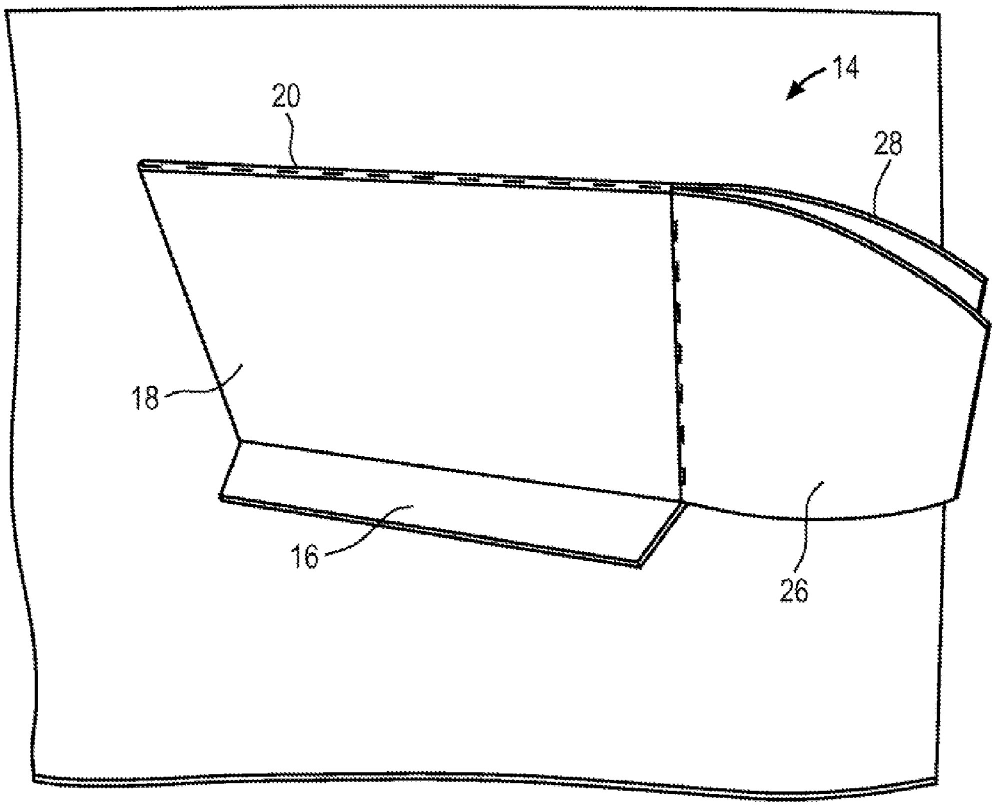
FIG. 2 is partial perspective view of a former from the signage assembly from FIG. 1.

As illustrated by FIG. 2, each of the formers 14 are formed from a single piece of corrugated material that includes a tab portion 16, a front former body portion 18 extending from the tab portion, and a back former body portion 20 extending from the front former body portion. In certain embodiments, the formers 14 are secured to an inner surface of the main body 12 via an adhesive, such as glue, tape, or the like. In addition, in some embodiments, the front former body portion 18 and back former body portion 20 are secured to each other via an adhesive. Nevertheless, it will be appreciated that in other embodiments, other means of joining now known or hereinafter developed are used, including but not necessarily limited to various styles of fasteners, such as staples, rivets, hooks, pins, and the like. With reference to FIG. 1, each of the formers 14 are secured to a first portion 22 of the main body 12, such that a second portion 24 of the main body are capable of being folded over the first portion and the formers 14. In certain embodiments, the second portion 24 is folded about a fold line (not shown) positioned longitudinally along of the main body 12, as will be discussed in more detail below. In certain embodiments, the fold line is positioned down a longitudinal centerline of the main body 12, such that the first portion 22 and the second portion 24 comprise equal halves of the main body. Nevertheless, in other embodiments, the first portion 22 is larger than the second portion 24, such that when the second portion is folded over the first portion, some of the first portion is left free to fold under the second portion and is thus capable of beings secured to the second portion, as shown by FIGS. 4-5 and as will be discussed in more detail below.

Figure 3:
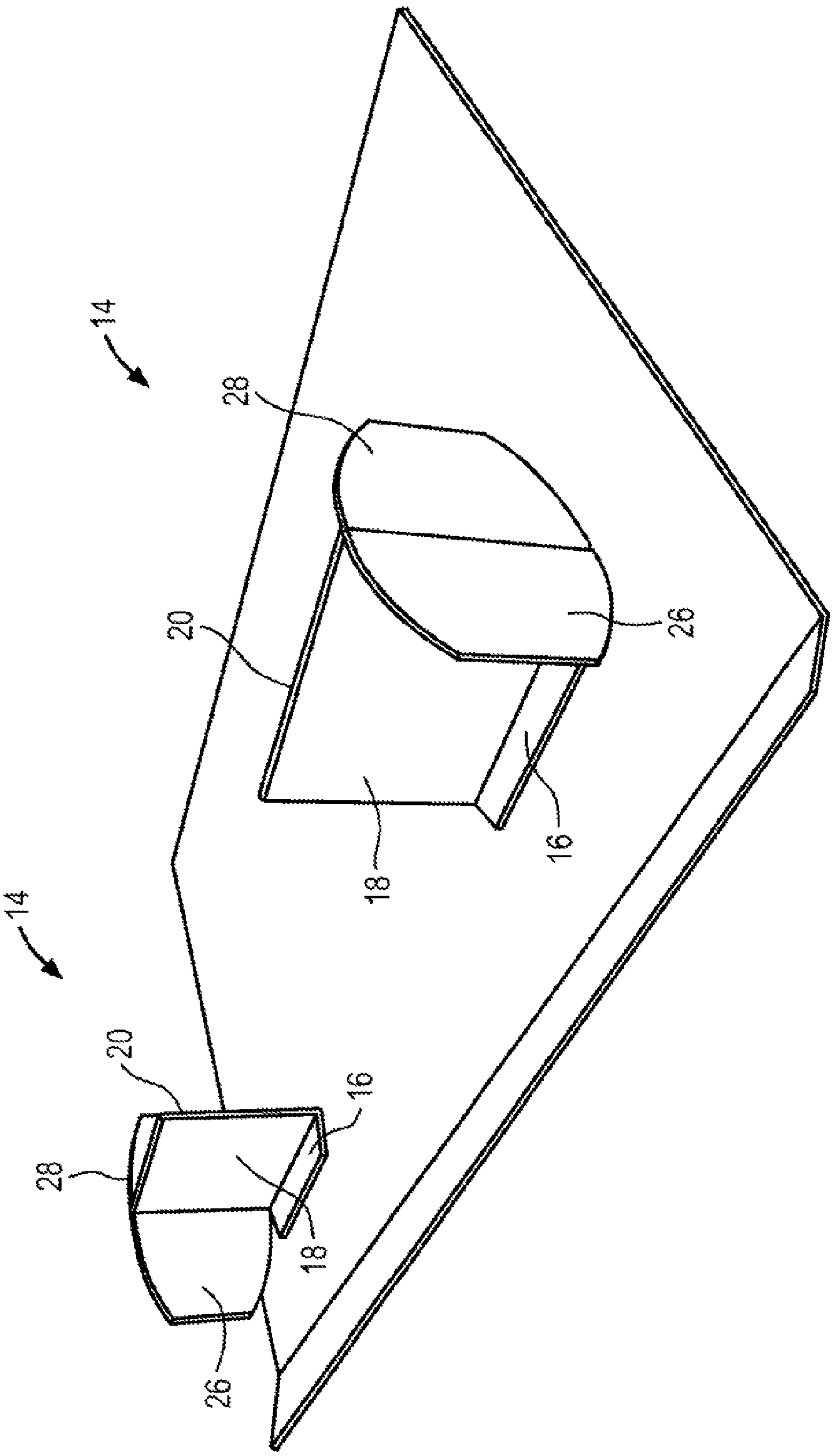
FIG. 3 is a perspective view of the signage assembly from FIG. 1, with the formers erected.

As shown in FIG. 3, in certain embodiments, the front former body portion 18 folds or rotates with respect to the tab portion 16 along a pre-folded, pre-weakened or perforated fold line connecting the former body portion to the tab portion. For example, in some embodiments, the fold line is formed by compressing along a thin line defining the fold line. Similarly, in some embodiments, the back former body portion 20 folds or rotates with respect to the tab portion 16 along a pre-folded, pre-weakened or perforated fold line connecting the former body portion to the tab portion. Returning to FIG. 2, the front former body portion 18 includes a front wing portion 26 and the back former body portion 20 includes a back wing portion 28 extending therefrom. As shown in FIG. 2-3, the front former body portion 18 and the front wing portion 26 of the front former body portion are also be separated by a fold line so that the front wing portion is capable of being folded or rotated with respect to the former body portion. Additionally, some embodiments provide for the back former body portion 20 and the back wing portion 28 to be separate by a fold line so that the back wing portion is capable of being folded or rotated with respect to the former body portion. In certain embodiments, the wing portions 26, 28 are formed in the shape of a semi-circle. However, in other embodiments, the wing portions 26, 28 are formed in other shapes, such as squares, triangles, ellipses, or the like. As will be discussed in more detail below, the shape of the wings portions allow for a corresponding shape main body 14 when the signage assembly is formed in its erected configuration.

As shown in FIG. 1, in the knockdown configuration of the signage assembly 10, the tab 16 for each former body 14 is attached to the main body 12, and the front former body portion 18 and back former body portion 20 are secured together, leaving the front wing portion 26 and the back wing portion 28 separated from each other (e.g. not secured together). Each former body 14 is positioned generally flat against the main body 12, with the back former body portion 20 positioned adjacent to the inner surface of the main body and the front former body portion 18 positioned against the back former body portion (or vice versa). In certain embodiments, such as illustrated in FIG. 4, the knockdown configuration of the signage assembly 10 has the second portion 24 of the main body 12 folded around the first portion 22 of the main body 12 and the formers 14, such that the first portion overlaps slightly (e.g. 1 or 2 inches) with the second portion, creating an overlapping section 30 of the first portion. In certain embodiments, the overlapping section 30 of the first portion 22 is folded underneath the second portion via a fold line and secured with the second portion 24 via glue or the like. As such, the signage assembly 10 is configurable in a flat, knockdown configuration that facilitates storage and transportation. In certain other embodiments, the signage assembly 10 is folded numerous additional times to further reduce a footprint size of the signage assembly for storage and/or transport.

Figure 4:
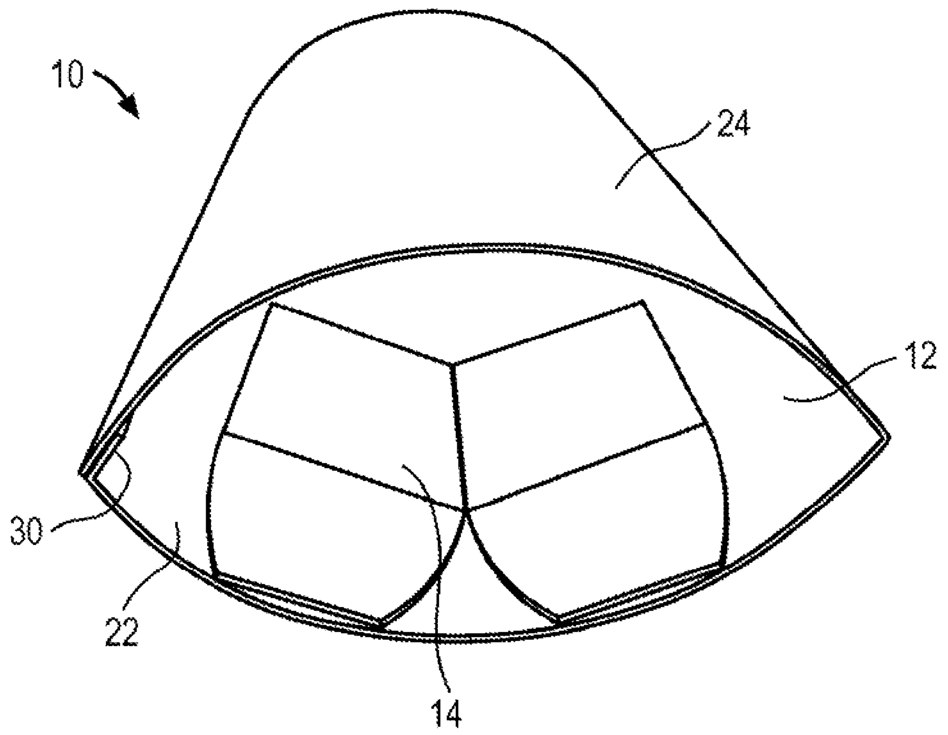
FIG. 4 is perspective view of the signage assembly from FIG. 1 in an additional partial knockdown configuration according to embodiments of the present invention, with the main body folded around two formers that are shown in knockdown configuration in FIG. 4.
Figure 5:
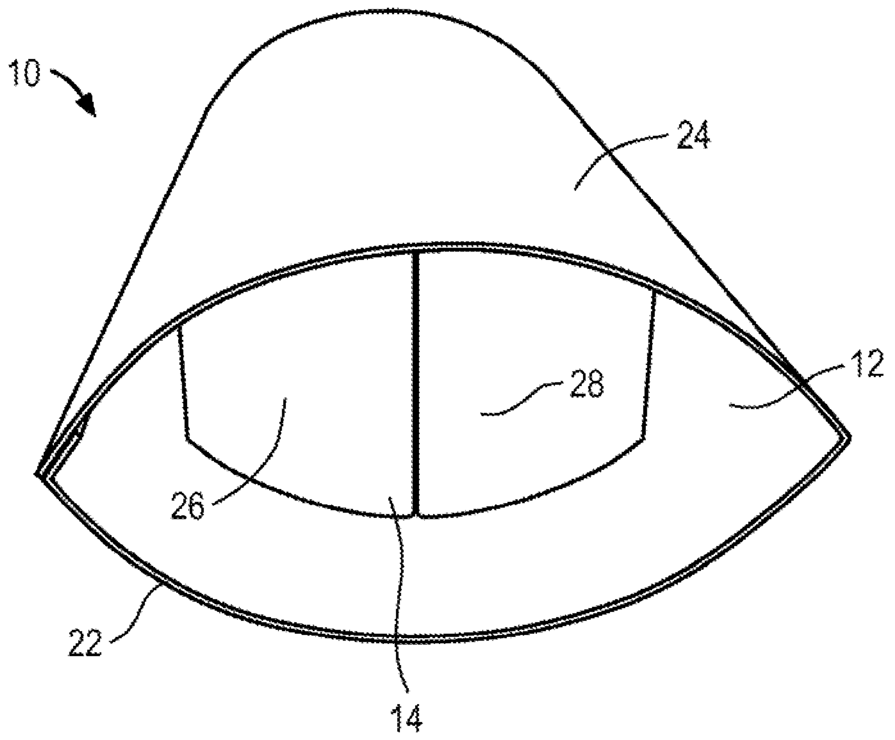
FIG. 5 is perspective view of the signage assembly from FIGS. 1, 2, and 4 in an erected configuration according to embodiments of the present invention, with the signage positioned horizontally.

In operation, the signage assembly 10 is capable of being erected from the knockdown configuration illustrated in FIG. 1 or 4, to the erected configuration illustrated in FIGS. 5-6 by performing the following steps. First, the signage assembly 10 is unfolded or unflattened from any folds that were applied for storage and/or transportation purposes (e.g. first portion 22 and section portion 24 of main body 12 are spread apart from each other), until the signage assembly is positioned in the unfolded or opened/elliptical, knockdown configuration shown in FIG. 4. Next, the formers 14 are folded away from the inner surface of the main body 12 about the tab 16, until the former bodies 18, 20 are generally positioned in an orthogonal orientation with respect to the main body 12 (i.e., the formers position illustrated in FIG. 3). Thereafter, the wing portions 26, 28 of the front and back former portions 18, 20, respectively, are folded to be generally orthogonal with the former portions 18, 20, such that the wing portions act as structural supports for the first and second portions 22, 24 of the main body 12 (i.e., such as illustrated in FIG. 5). Thus, the formers 14 are operable to create and support the main body 12 into an elongated elliptical shape. As such, the signage assembly 10 is in an erected, three-dimensional configuration, such as illustrated in FIG. 5-6. Thereafter, the signage assembly 10 is positioned on a ground surface with a longitudinal direction of the signage assembly being generally vertical with the ground surface, such as illustrated in FIG. 6. In such a position, the signage assembly 10 is self-supporting. Furthermore, in certain embodiments, the signage assembly 10 includes graphic displays on its outer surface, such that the signage assembly is formed for use as a graphic display and/or sign for marketing or other display purposes.

Although former bodies 18, 20 are shown in FIG. 4 as being separated from each other (e.g. not glued or otherwise adhered together) other than at tab 16, it will be appreciated that in some embodiments, former bodies 18 and 20 are connected together along the edges directly opposing tab 16. In some such embodiments, former bodies 18 and 20 are two portions of a single piece of material that is folded together along the joining edge, which oppose tab 16. Further, in some such embodiments, former bodies 18 and 20 are adhered together via and adhesive placed along adjoining surfaces of former bodies 18 and 20. In such embodiments, former bodies 18 and 20 will be folded flat together with each other when in knock down configurations such as in the manner shown in FIG. 1. In embodiments in which former bodies 18 and 20 are adhered to each other, wing portions 26 and 28 remain separated from each other in the manner discussed above. In some embodiments, tab 16 includes two tab portions, with one tab each attached or formed from each of former bodies 18 and 20.

Although the invention has been described with reference to the embodiments illustrated in the attached drawing figures, it is noted that equivalents may be employed and substitutions made herein without departing from the scope of the invention as recited in the claims. For instance, it will be appreciated that in certain embodiments the signage assembly 10 of the present invention is capable of being utilized in either a vertical or horizontal orientation (i.e., about either a longitudinal or lateral direction of the assembly). In some embodiments in which the signage is utilized in a horizontal orientation, additional structure, such as bottom support tabs or feet are utilized to support the signage assembly 10 to provide for additional support.

In the foregoing description, certain terms have been used for brevity, clearness and understanding; but no unnecessary limitations are to be implied therefrom beyond the requirements of the prior art, because such terms are used for descriptive purposes and are intended to be broadly construed. Moreover, the description and illustration of the inventions is by way of example, and the scope of the inventions is not limited to the exact details shown or described.

Although the foregoing detailed description of the present invention has been described by reference to an exemplary embodiment, and the best mode contemplated for carrying out the present invention has been shown and described, it will be understood that certain changes, modification or variations may be made in embodying the above invention, and in the construction thereof, other than those specifically set forth herein, may be achieved by those skilled in the art without departing from the spirit and scope of the invention, and that such changes, modification or variations are to be considered as being within the overall scope of the present invention. Therefore, it is contemplated to cover the present invention and any and all changes, modifications, variations, or equivalents that fall with in the true spirit and scope of the underlying principles disclosed and claimed herein. Consequently, the scope of the present invention is intended to be limited only by the attached claims, all matter contained in the above description and shown in the accompanying drawings shall be interpreted as illustrative and not in a limiting sense.

Having now described the features, discoveries and principles of the invention, the manner in which the invention is constructed and used, the characteristics of the construction, and advantageous, new and useful results obtained; the new and useful structures, devices, elements, arrangements, parts and combinations, are set forth in the appended claims.

It is also to be understood that the following claims are intended to cover all of the generic and specific features of the invention herein described, and all statements of the scope of the invention which, as a matter of language, might be said to fall therebetween.

The invention claimed is:

1. A method of making a corrugated display sign, comprising:

forming a main body with a first section and a second section;

forming a fold line on said main body between said first and second sections so as to define respective proximal ends of said first and second sections;

joining a proximal end of said former to said first section of said main body such that said former is moveable between a stowed configuration and a deployed configuration;

folding said second section of said main body about said fold line until a distal end of said second section is moved into close proximity to a proximal end of said main section; and securing said distal end of said second section to said distal end of said first section such that the corrugated display sign is moveable between a flat configuration and a three-dimensional configuration by moving the former between the stowed configuration and the deployed configuration, respectively, wherein said distal end of said former is positioned adjacent to said first section when said former is in the stowed configuration, wherein said distal end of said former is positioned adjacent to said second section when said former is in the deployed configuration.

2. The method of claim 1, wherein said display sign is formed from corrugated paperboard material.

3. The method of claim 1, wherein forming said former includes forming a tab section, a front former body extending from said tab section, a back former body extending from a distal end of said front former body towards said tab portion, a front wing extending from an edge of said front former body, and a back wing extending from an edge of said back former body.

4. The corrugated display sign from claim 3, wherein said former is generally orthogonal with said main body when said former is in the deployed configuration.

5. The corrugated display sign from claim 4, wherein said front and back wings are each moveable between respective stowed and deployed configurations, said front and back wings being generally orthogonal with said first and second portions of said main body and with respective front and back former bodies of said former when said front and back wings are in their respective deployed configurations.

6. The corrugated display sign from claim 5, wherein said front wing extends in a first direction when said front wing is in its deployed configuration and wherein said back wing extends in a second direction when said back wing is in its deployed configuration, the first and second directions being generally opposite each other.

7. The corrugated display sign from claim 1, wherein an outer surface of said display sign is formed with a graphic display.

8. A corrugated display sign moveable between a flat configuration and a three-dimensional configuration, the display sign comprising:

a main body having an inner surface and an outer surface, said main body including first and second portions coupled together at respective proximal ends of said first and second portions, said second portion being folded over said first portion at said proximal ends and extending towards a distal end of said first portion, a distal end of said second portion being secured to said distal end of said first portion; and at least one former positioned between said first and second portions of said main body, said former being secured to said first portion of said main body, wherein said former includes a tab section that secures said former to said inner surface of said first portion of said main body, wherein said former further includes a front body portion extending from said tab section, a back body portion extending from a distal end of said front body portion towards a proximal end of said front body portion, and front and back wing portions extending from edges of respective front and back body portions, and wherein said former is moveable between a stowed configuration and a deployed configuration by rotating said front and back body portions relative to said tab section while said distal end of said back body portion maintains a constant distance from said proximal end of said front body portion, thereby causing the display sign to move from the flat configuration to the three-dimensional configuration, wherein said distal end of said first body portion is positioned adjacent to said inner surface of said first portion of said main body when the former is in the stowed configuration, and wherein said distal end of said first body portion is positioned adjacent to said inner surface of said second portion of said main body when the display sign is in the three-dimensional configuration and said former is in the deployed configuration.

9. The corrugated display sign from claim 8, wherein said display sign is formed from corrugated paperboard material.

10. The corrugated display sign from claim 8, wherein said second portion is configured to be folded about said first portion via fold lines.

11. The corrugated display sign from claim 8, wherein said former is generally orthogonal with said main body when said former is in the deployed configuration.

12. The corrugated display sign from claim 11, wherein said front and back wing portions are each moveable between respective stowed and deployed configurations, said front and back wing portions being generally orthogonal with said first and second portions of said main body and with respective front and back former bodies of said former when said front and back wing portions are in their respective deployed configurations.

13. The corrugated display sign from claim 12, wherein said front wing portion extends in a first direction when said front wing portion is in its deployed configuration and wherein said back wing portion extends in a second direction when said back wing portion is in its deployed configuration, the first and second directions being generally opposite each other.

14. The corrugated display sign from claim 8, wherein said outer surface of the display sign is operable to include a graphic display.

15. A method of erecting a corrugated display sign, comprising:

providing the corrugated display sign in a knockdown configuration, wherein said corrugated display sign includes:

a main body with a first portion and a second portion;

a former panel secured to said main body, with said former panel including:

a tab section that secures said former to said main body, a front body portion with a wing portion, and a back body portion with a wing portion;

folding said front body portion and said back body portion until said portions are generally orthogonal with said main body while said front body portion is folded against said back body portion;

folding said wing portions of said front body portion and said back body portion until said wing portions are generally orthogonal with said body portions;

folding said second portion of said main body around said first portion and said formers; and securing an end of said second portion with an end of said first portion.

16. The method of claim 15, wherein said display sign is formed from corrugated paperboard material.

17. The method of claim 15, further comprising:

forming a graphic display on an outer surface of said display sign.

18. The method of claim 15, wherein said wings of said formers are shaped in a semi-circle, such that when said second portion of said main body is folded around said wings, said main body is shaped in an elongated ellipse.

* * * * *